July 16, 1940.  I. W. KNIGHT  2,207,865

THERMOSTATIC CONTROLLER FOR UNIT HEAT EXCHANGERS

Filed Oct. 7, 1939  2 Sheets-Sheet 1

Ira W. Knight, Inventor

By Harry Dexter Pick, Attorney

July 16, 1940.  I. W. KNIGHT  2,207,865
THERMOSTATIC CONTROLLER FOR UNIT HEAT EXCHANGERS
Filed Oct. 7, 1939  2 Sheets-Sheet 2
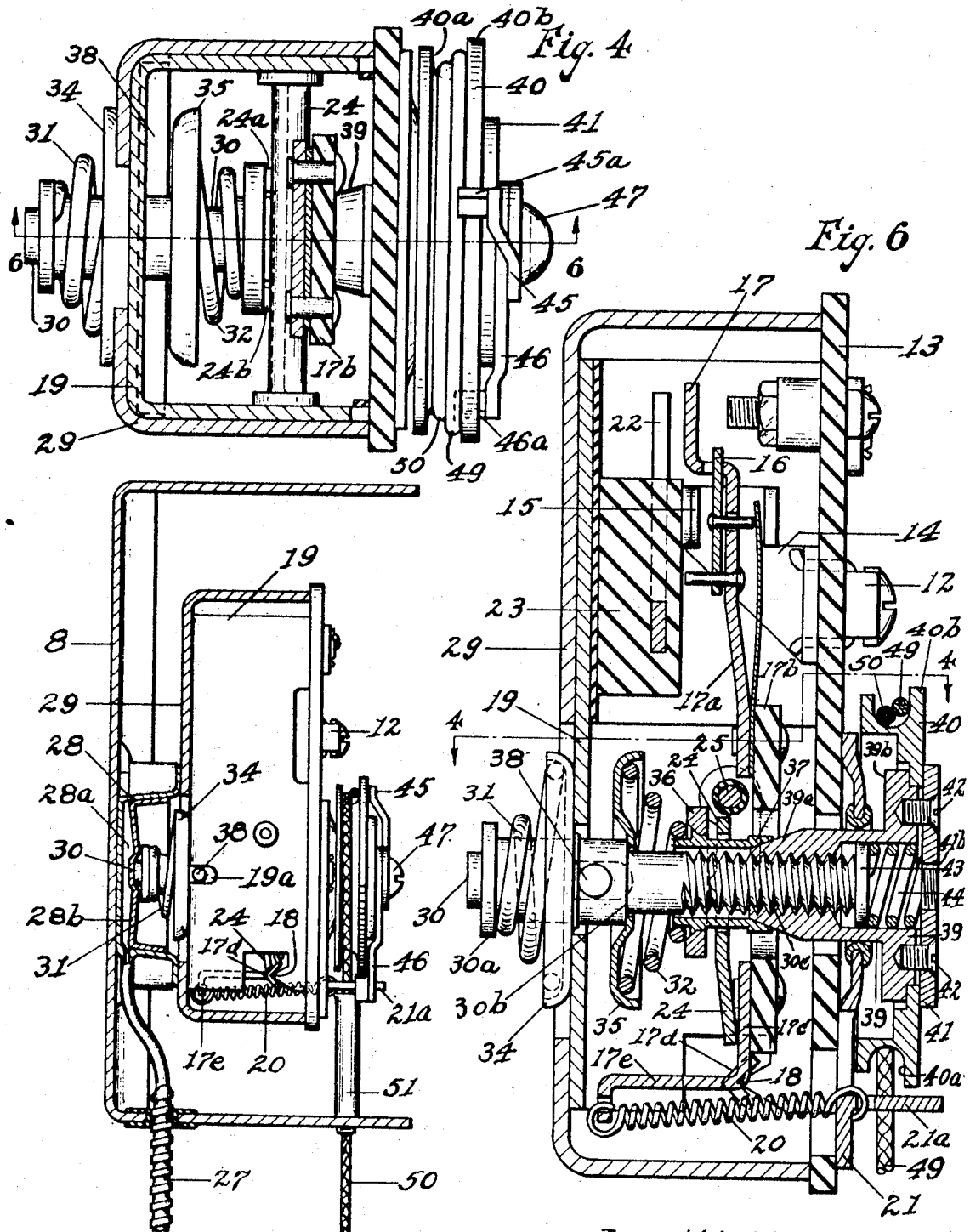
Ira W. Knight
Inventor
By Harry Dexter Peck
Attorney Patented July 16, 1940

2,207,865

UNITED STATES PATENT OFFICE 2,207,865

THERMOSTATIC CONTROLLER FOR UNIT HEAT EXCHANGERS

Ira W. Knight, Providence, R. I., assignor to General Fire Extinguisher Company, Providence, R. I., a corporation of Delaware Application October 7, 1939, Serial No. 298,447

2 Claims. (Cl. 236—51)

This invention relates to improvements in thermostatic controllers for unit heat exchangers. It has to do with such controllers employed with heating or cooling units located near the ceiling of an enclosure and more especially the invention resides in improved means whereby the control mechanism may be mounted on the heat exchanger and may be quickly and easily set for response at preselected temperatures by a person standing on the floor.

Heat exchangers with which the improved controller is intended to be associated, have a casing within which is housed a series of tubes for conducting a heating or cooling medium. A fan at one side or end of the casing causes, when in operation, a blast of air to pass by the tubes and be projected thence into the atmosphere of the enclosure being conditioned. By suitable deflectors the heated or cooled air leaving the unit may be directed as preferred, thus making it quite convenient to locate the unit itself near the ceiling entirely out of the way and yet have its treated air pass readily downward into the regions adjacent any occupants or users of the enclosure. The action of the heat exchanger may be controlled by either restricting or cutting off the flow of the heating or cooling medium through the tubes or by reducing the speed of or stopping the fan. In one instance the thermostatic controller regulates a suitable valve in the fluid flow line and in the other instance it affects a switch in the power line to an electric motor driving the fan. Preferably such a valve is located close by the manifold at the inlet to the tubes and usually such a fan and its motor are mounted on supports attached to the unit. While it would be feasible to locate a thermostatic controller on a wall of the enclosure and connect it electrically to one or more such valves or fans, there are advantages in having an individual controller more intimately associated with the particular unit it is controlling.

It is among the objects of the present invention to provide a controller with its mechanism enclosed in a casing which can be securely attached to the unit heat exchanger it is intended to control. It is a feature to provide this mechanism with means which may be set to permit the controller to be operative at different preselected temperatures.

It is also an object to provide a thermo-responsive element which can be suspended from the controller by a flexible connection and thus be effected by the temperature of the atmosphere nearby the occupants of the enclosure. And it is a particular feature to provide for the adjusting of the controller mechanism located in the casing by means easily accessible to a person on the floor.

The best mode in which I have contemplated applying the principles of my invention is shown in the accompanying drawings but these are to be deemed merely illustrative because it is intended that the patent shall cover by suitable expression in the appended claims whatever features of patentable novelty exist in the invention disclosed.

In the drawings:

Figure 4 is a plan in section as on line 4—4 of Figure 6;

Figure 5 is an elevation partly in section as on line 5—5 of Figure 3; and

Figure 6 is an elevation in section as on line 6—6 of Figure 4.

Figure 1:
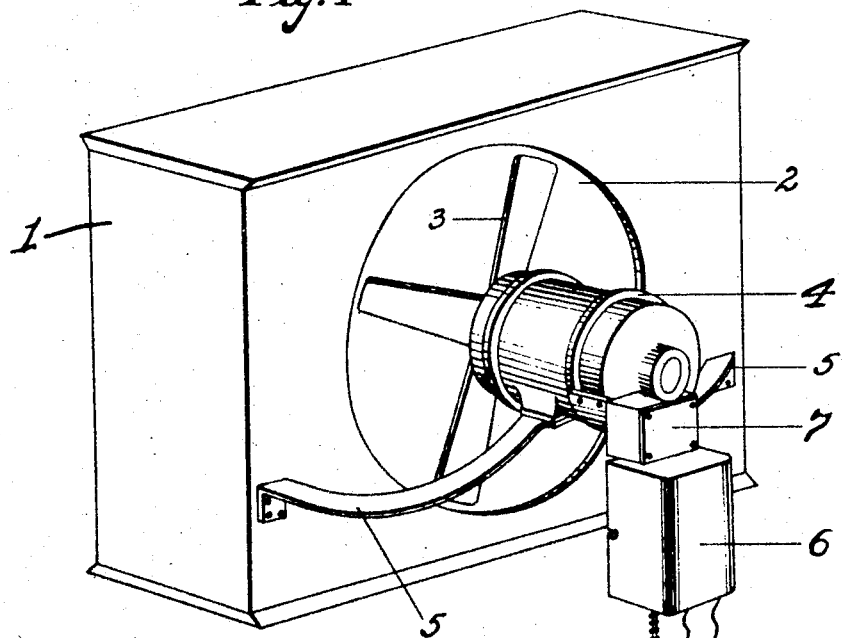
Figure 1 is a perspective of the rear of a heat exchanger having mounted thereon my improved thermostatic controller.
Figure 2:
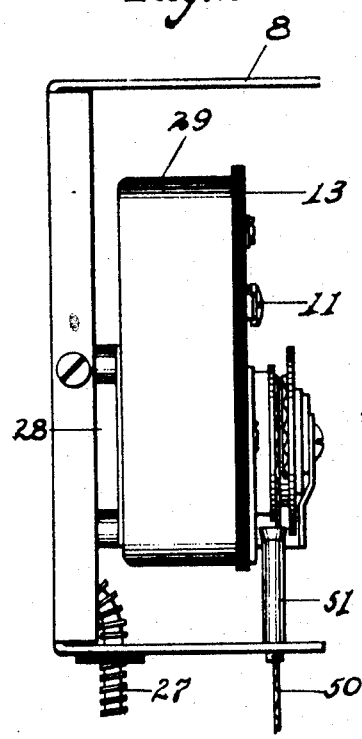
Figure 2 is a side elevation of the controller alone with the outer cover removed.

Referring now more particularly to the drawings, the heat exchanger shown for purposes of illustration has a casing 1 with a back opening 2 and a fan 3 mounted adjacent this opening in position to move air through the casing and past a series of tubes (not shown) through which either a heating or cooling medium may be circulated. The fan is driven by a direct-connected motor 4 mounted on brackets 5 secured to the heat exchanger. Attached to the unit in any convenient manner is a thermostatic controller 6 which in the illustrated structure opens or closes a switch in the power line to the fan motor 4. It is to be understood, however, that this switch could just as readily control a circuit to a relay or other electrical device whereby a valve could be opened or closed to regulate the flow of the heating or cooling medium through the tubes of the exchanger.

As shown herein, there is secured to the motor casing a junction box 7 to which in turn is secured a generally U-shape plate 8, the connection between the two embracing an opening through which wires 9 and 10 may pass from the junction box to terminals 11 and 12 on a small insulating panel 13. These terminals extend through the panel and each comprises a bracket arm 14 (see Fig. 6) and a contact point 15. The two contact points may be electrically connected by a contact plate 16 mounted on a lever 17 which comprises an upper portion 17a, an intermediate portion 17b and a base portion 17c. The side edges of the latter are provided with V-shaped journals 17d which engage V-shaped bearings 18 on another generally U-shaped plate 19 attached to the rear of the panel 13. A depending arm 17e on the portion 17c is connected by a tension spring 20 with a plate 21 secured to the front of panel 13. The pull of the spring constantly urges the lever 17 in an anti-clockwise direction as seen in Figure 6, so that the contact plate 16 will engage the contact points 15. When so engaged the lever 17 is also attracted in the same anti-clockwise direction by a U-shaped magnet 22 mounted in an insulating block 23.

By virtue of the magnet the movement of the lever occurs with a sort of snap-action, snapping to closed position on the points when it enters the field of the magnet and remaining attracted thereto until a force applied to the lever is great enough to move it away from the contact points with a like snap-action movement.

Such opening force on the lever 17 is applied by a second lever 24 mounted on an axle pin 25 extending between the opposite sides of the U-shaped plate 19. This closing force is generated by the expansion of an expansible fluid contained in a bulb 26, a flexible connecting tube 27 and a sealed casing 28. The latter is interposed between an inner cover member 29 and the rear wall of the U-shaped plate 8. Its chamber 28a is connected by the flexible tube 27 with the chamber in the cartridge 26. Rise of temperature causes expansion of the expansible fluid and effects movement of the diaphragm wall 28b of the casing 28. The wall engages the end of a rod member 30 and moves the latter toward the right as seen in Figures 4–6.

Movement of the rod by the force of the expanding fluid is opposed by two coiled springs 31 and 32. Spring 31 is appreciably stronger than spring 32 and is coiled between a circular shoulder 30a on the rod 30 and a suitable washer 34 which is loose on the rod and rests against the back side of the U-shaped plate 19. Spring 32 is likewise coiled about the rod 30, its larger end seating in another washer 35 whose inner edge abuts against a shoulder 30b on the rod 30. The smaller end of spring 32 engages a ring 36 carried by a sleeve member 37 which extends part way along the threaded end 30c of the rod 30. On the lever 24 are outstanding V-shaped ridges 24a and 24b (see Fig. 4) which rest against the ring 36. Extending through the rod 30 is a pin 38 with its ends engaging opposed slots 19a in the side walls of the U-shaped plate 19.

Upon movement to the right of the diaphragm wall 28b, the rod 30 is likewise moved and by virtue of washer 35, spring 32 and ring 36, the lever 24 is swung counterclockwise about its axle 25 to effect clockwise movement of lever 17 about its bearings 18 and thus move contact plate 16 away from points 15 to open the circuit to the fan motor 4. The means for bringing about this result at any predetermined temperature will now be described.

A sleeve nut 39 is screwed onto the threaded end 30c of rod 30, having an externally tapering inner end 39a which engages a similarly internal taper of the sleeve 37. At its outer end the sleeve nut 39 is provided with a circular flange 39b to which an index member 40 is clamped by a disk 41 and screws 42. Between the disk 41 and the end of rod 30 is a disk 43 and coiled spring 44 to insure against any lost motion between the screw threads of the sleeve nut 39 and the rod 30.

Figure 3:
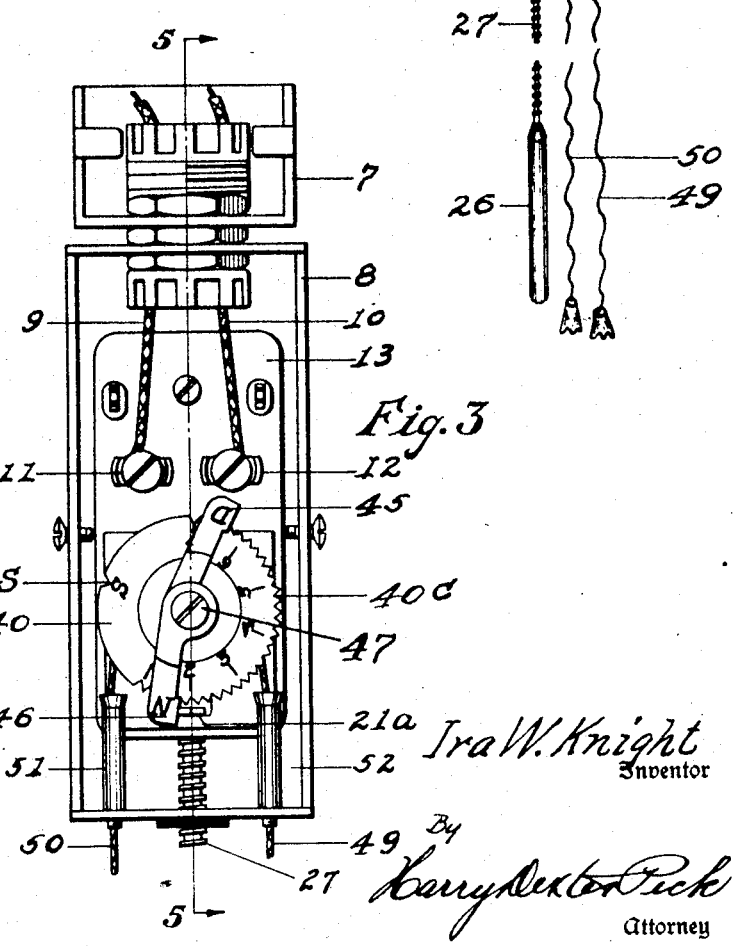
Figure 3 is a front elevation of the controller as shown in Figure 2.

The member 40 has a groove 40a around its circumference and the edge 40b of one wall of this groove is provided with notches 40c. (See Fig. 3.) Stop fingers 45 and 46 are mounted on the disk 41 by a screw 47 which engages a threaded hole 41a at the center of said disk. When this screw is partly backed out, the fingers may be rotated so that their respective flanges 45a and 46a may be set in any selected notches 40c on the index member 40. Upon the screw being then tightened the fingers are locked in place so that as the index member is rotated one or the other of flanges 45a 46a will bring up against a stop 21a struck out from plate 21. Suitably secured to the index member 40 are two cords, 49 and 50 (preferably of distinguishing colors), which pass from opposite sides of the member through guide tubes 51 and 52 mounted in the base portion of the U-shaped plate 8.

These cords are intended to hang down from the controller to a much lower level and within easy reach of a person standing on the floor. Likewise the bulb 26 is also to hang at some level reasonably adjacent to the zone or region whose temperature is to determine the action or inaction of the heat exchanger. By virtue of the flexible nature of the tube 27, the bulb may be suspended even at levels where it may infrequently be hit, the flexibility of the tube permitting the bulb to swing and not be damaged by contact with any passing body.

In setting the controller, a very common practice is to determine the temperature to be maintained while persons are present in the enclosure and also a lower temperature that would suffice when the enclosure is unoccupied. For example, let us assume that in the daytime, or working hours, the temperature desired is 70° F., and that at nighttime when no one is ordinarily present in the enclosure, a temperature of 50° F. will suffice. Starting with the index wheel 40 turned as far counterclockwise as possible, the bulb will be brought to a temperature of 50° F. and the index wheel then turned clockwise until the lever 17 snaps into contact with the contact points 15. The index finger 46 is then set with its flange 46a against the left side of stop 21a. The bulb is then heated to 70° F. and the index wheel 40 is rotated still further clockwise until again the lever 17 snaps into contact with the points 15. Finger 45 is now set with its flange against the right side of stop 21a. The screw 47 is thereupon tightened and the outer cover may be put on the controller.

When a temperature of 70° F. is desired in the enclosure, cord 49 will be pulled to set finger 45 against stop 21a. Thereafter whenever the temperature in the vicinity of the cartridge reaches or exceeds 70° F., the expansion of the fluid and consequent movement of the diaphragm wall 28b will move rod 30 and, as hereinbefore described, effect the separation of contact bar 16 from the points 15. Conversely, should the temperature fall below 70° F. the fluid will contract and spring 31 will cause the rod 30 and other moving parts to move toward the left to permit bar 16 to again contact the points 15. When nighttime or closing time arrives all one need do to set the controller for the preselected low temperature is to pull cord 50 until finger 46 engages the stop 21a. Thereafter the controller will operate to stop or start the fan motor according as the temperature in the neighborhood of the cartridge exceeds or drops below the preselected low temperature.

In the case of a unit heater where the controller is in the power circuit to the fan, it may be desirable to set the controller at an exceedingly high temperature so that throughout the summer months the fan may be operated in the daytime for general circulation of the air. The heating fluid to the exchanger will of course be shut off during the summer. Such a particular high setting may be conveniently had by a notch of 40S on the index wheel well above the normal range of day and night temperatures. By setting finger 45 in this particular notch at the beginning of the summer season, and then pulling on cord 49 until this finger brings up against the stop 21a, the fan will be continued in operation during the daytime unless some extraordinary high temperatures should occur. At night the cord 50 can be pulled to bring arm 46 to the stop 21a and thus shut down the fan operation until the next morning.

A controller embodying my inventions enjoys several advantages. It may itself be secured to the heat exchanger whose actions it is to control. This places the controller well up out of harm's way and avoids the need of any extended electrical circuits between the unit and its controller. The controller once set is left entirely closed except for the small bottom openings through which the cords pass. It is not convenient for anyone to reset the controller and this is by no means an undesirable arrangement. But by virtue of the cords and the associated mechanism actuated thereby, the controller may be easily, quickly and correctly adjusted each morning and evening at the preselected temperatures desired and, during the summer, for effecting continuous operation of the fan to produce ventilation of air in the enclosure. The extended flexible tubular connection between the controller proper and the hanging bulb insures operation of the unit in response to changes of temperature occurring in the vicinity of the occupants and without danger of damage to the operating mechanism should the belt be inadvertently hit. And the ruggedness and simplicity of the mechanism insure long life and dependable action of the controller with ease of adjusting it for operation at preselected temperatures.

I claim:

1. A thermostatic controller for a heat exchange unit comprising a casing adapted for attachment to said unit and housing thermally actuated mechanism for controlling the operation of said unit; a conduit containing an expansible fluid leading from said mechanism to a bulb located in a region appreciably below the heat exchanger whereat the temperature is to be affected by the operation of said unit; said mechanism including an electric switch, a movable element capable in the course of its movement of changing the condition of said switch, means rotatable with respect to said element whereby the extent of movement thereof to change the switch is determined, and an adjustable member associated with said rotatable means for limiting the rotation of said rotatable means whereby the operation of said controller may be set for a preselected temperature; and means extending from said rotatable means to the vicinity of said bulb whereby the rotatable means may be rotated to adjust the controller to operate at said preselected temperature.

2. A thermostatic controller for a heat exchange unit comprising a casing adapted for attachment to said unit and housing thermally actuated mechanism for controlling the operation of said unit; a conduit containing an expansible fluid leading from said mechanism to a bulb located in a region appreciably below the heat exchanger whereat the temperature is to be affected by the operation of said unit; said mechanism including an electric switch, an element movable in response to the expansion and contraction of said fluid; means interposed between said element and said switch to transfer the movement of said element to said switch and thereby change its condition and a rotatable member associated with said interposed means whereby the extent of movement of said element may be varied to effect changes in said switch at preselected temperatures; adjustable means for limiting the rotation of said rotatable member at two different points corresponding to different preselected temperatures in the region of said bulb; and means extending from said rotatable member to the vicinity of said bulb whereby the rotatable member may be moved to one or the other of its limits to thereby adjust the controller for operation at one or the other of said preselected temperatures.

IRA W. KNIGHT.